(No Model.)
C. J. JOHNSON.
MEANS FOR REPAIRING PNEUMATIC TIRES.
No. 591,477. Patented Oct. 12, 1897.
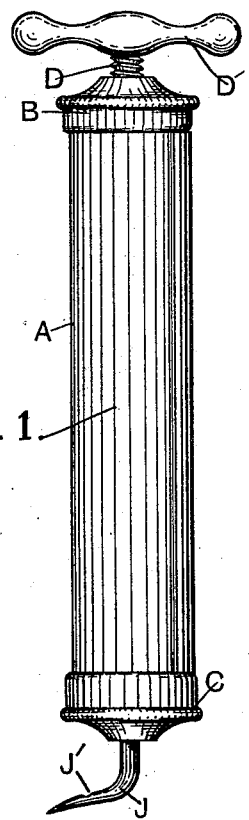
Fig. 1.
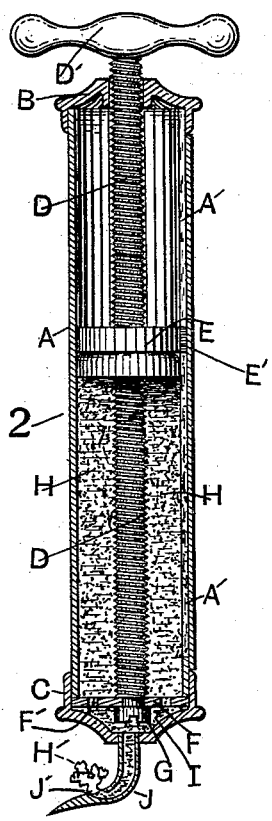
Fig. 2.
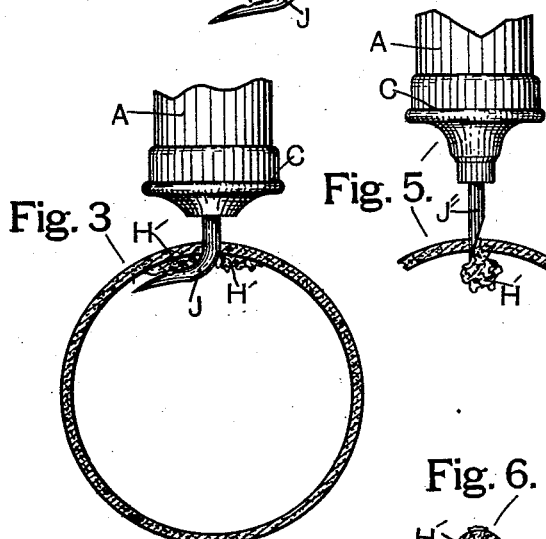
Fig. 3. Fig. 5.
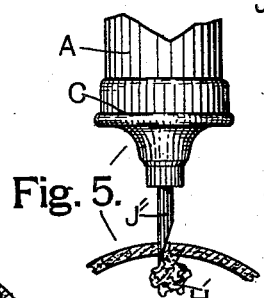
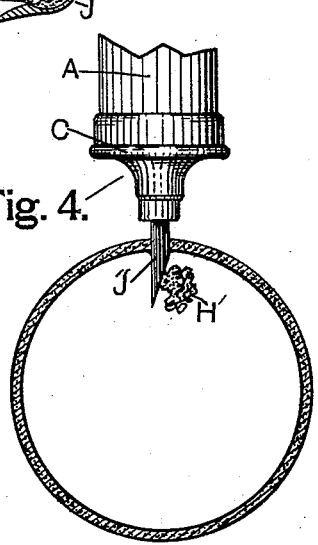
Fig. 4.
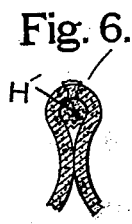
Fig. 6.
WITNESSES:
H. H. Hale
H. L. Brown
INVENTOR:
Charles J. Johnson
By his atty.
Oscar Snell

UNITED STATES PATENT OFFICE.

CHARLES J. JOHNSON, OF CHICAGO, ILLINOIS, ASSIGNOR OF ONE-HALF TO GEORGE L. SCHOENEBERGER, OF SAME PLACE.

MEANS FOR REPAIRING PNEUMATIC TIRES.

SPECIFICATION forming part of Letters Patent No. 591,477, dated October 12, 1897.

Application filed October 31, 1896. Serial No. 610,692. (No model.)

*To all whom it may concern:*

Be it known that I, CHARLES J. JOHNSON, a citizen of the United States, residing at Chicago, in the county of Cook and State of Illinois, have invented a new and useful Means for Repairing Pneumatic Tires, of which the following is a specification.

My invention relates to means for repairing pneumatic tires; and my object is to produce an effect which is particularly adapted to closing the punctures incident to the use of the ordinary single or double tube bicycle pneumatic tire, which effect and the means for producing the same are described hereinafter and are illustrated by the accompanying drawings, in which—

Figure 1 is an elevation, and Fig. 2 an axial section, of the cylindrical casing and the bottom and top covers thereof and of a perforated diaphragm near the bottom end. A revoluble screw within the casing and the screw outside of the casing and the handle therefor, together with a piston within the casing, through which piston the screw passes, are shown in elevation. A hollow bent needle is shown in section attached to the lower casing-cover, which needle is in communication with the interior of the casing. Fig. 3 is a cross-section of a pneumatic tire, showing a portion of the lower end of the tool, with a bent hollow needle inserted within a puncture therein. Fig. 4 is a portion of the lower end of the tool, showing a straight hollow needle inserted through a puncture in a tire which latter is shown in cross-section. Fig. 6 shows a partial cross-section of a portion of a tire squeezed together laterally to illustrate manner of forcing a deposit of cement from the tool close around a puncture.

Similar letters indicate like parts throughout the several views.

The mechanical portion of this invention consists, essentially, of a chamber in which cement is subjected to pressure, and there is connected to and in communication with such chamber a hollow needle whose point is adapted to be easily inserted through a puncture, or of itself make a puncture, so that the inner end thereof is within the hollow portion of the tire, where the cement may be forced out of an orifice at the side or at the end of the needle and the cement be forced or drawn into contact with the inside surface of the tire at the puncture and close the same. In this instance the casing A is cylindrical and provided with end covers B and C. At D is a screw surmounted by a handle D', and which extends down through the top cover B and through the axial screw-threaded hole in a piston E, which latter closely fits the inside of casing A and is adapted to slide longitudinally therein by the action of the screw D, but is prevented from revolving by virtue of a projection E' at one side, which is adapted to slide in a longitudinal groove A' in the side walls of the casing. Screw D is movably secured at the lower end to a stationary diaphragm-plate F at the lower end of the casing by means of a screw G, whose head engages the diaphragm and prevents the screw D from rising when operating the piston E downwardly against the cement H, which is disposed within casing A, between piston E and diaphragm F, which latter is perforated, as at F', to permit the cement under pressure to flow out into the small chamber I and thence into and through the hollow needle J and out the orifice J' thereof. Diaphragm F serves the double purpose of forming an always-lubricated collar-bearing for the lower end of the screw-threaded rod D and prevents its longitudinal movement when being rotated, and also by virtue of the perforations separates and then again mixes the cement in the chamber I, the pressure in passing through the perforations causing a rise in temperature of the cement, and hence a temporary greater fluidity just before it is ejected from the needle upon the surface of the interior of the tire, so that by this means a cement may be used which is of much less viscidity than usual, which will stick at once to the surface of the tire and very quickly set after it loses its temporary higher temperature. Another advantage in providing this diaphragm is that the lower cover, together with the hollow needle, may be removed at any time without disturbing the collar-bearing at the inner end of the threaded operating-rod D.

In operation the needle J is first thrust through the tire at the puncture, with the orifice J' thereof close to the inside surface of the tire, when the handle D' is turned, which causes screw D to force piston E downwardly, and thereby subject the cement H to a strong pressure, when it will flow out at the needle-orifice J' and form a clot, as at H' in Figs. 2, 3, 4, and 5. If now the tool when supplied with a bent needle, as shown in Fig. 3, is revolved on its axial center, the bent portion of the needle will spread the cement in a circular form around the puncture, when the needle may be withdrawn and the sides of the tire squeezed in, as shown in Fig. 6, when the cement will flow toward the puncture and effectually close it against the egress of air after a few minutes to allow it to set. Where very small punctures are to be closed, the straight needle J'' (shown in Figs. 4 and 5) is desirable, for after a small amount of the cement has been ejected with the needle in the position shown in Fig. 4 if the needle is extracted the tenacious and sticky quality of the cement causes it to follow and attach itself to the inside surface of the tire and cover the puncture.

By squeezing in the sides of the tire, as before described, the cement may be made to more closely attach itself into and around the puncture.

Needles may be provided much longer than those shown in the drawings when it is necessary to cover a very large surface of the tire inside with cement in case of an extensive rupture therein.

I claim—

In a means for repairing pneumatic tires with viscid cement, a cylinder, a piston within the cylinder having a projection at one side adapted to slide in a longitudinal groove in the cylinder, a screw-threaded revoluble rod disposed axially through the cylinder, and axially through and in engagement with a screw-threaded hole in the piston, a cover at the lower end of the cylinder between which and the piston is a perforated diaphragm and forming a compression-chamber, the diaphragm forming a second chamber between itself and the lower cover, the inner end of the threaded rod mounted in the diaphragm, a hollow needle leading outwardly attached to the lower cover and in communication with the second chamber, the whole serving in combination for the purpose stated.

In testimony that I claim the foregoing I have hereunto set my hand, this 23d day of October, 1896, in the presence of witnesses.

CHARLES J. JOHNSON.

Witnesses:
OSCAR SNELL,
GEORGE L. SCHOENEBERGER.